(12) United States Patent
Zhang

(10) Patent No.: US 8,165,161 B2
(45) Date of Patent: Apr. 24, 2012

(54) METHOD AND SYSTEM FOR FORMATTING ENCODED VIDEO DATA

(75) Inventor: Bo Zhang, Westford, MA (US)

(73) Assignee: Broadcom Advanced Compression Group, LLC, Andover, MA (US)

( * ) Notice: Subject to any disclaimer, the term of this patent is extended or adjusted under 35 U.S.C. 154(b) by 2281 days.

(21) Appl. No.: 11/096,603

(22) Filed: Apr. 1, 2005

(65) Prior Publication Data

US 2006/0222014 A1    Oct. 5, 2006

(51) Int. Cl.
*H04J 3/24* (2006.01)
(52) U.S. Cl. .......................... 370/474; 370/252
(58) Field of Classification Search .......... 370/389, 370/474, 476, 252
See application file for complete search history.

(56) References Cited

U.S. PATENT DOCUMENTS

| | | | |
|---|---|---|---|
| 6,850,519 B1 * | 2/2005 | Saito et al. | 370/389 |
| 2002/0071434 A1 * | 6/2002 | Furukawa | 370/392 |
| 2005/0047449 A1 * | 3/2005 | Adolph et al. | 370/538 |
| 2007/0268927 A1 * | 11/2007 | Baba et al. | 370/437 |

\* cited by examiner

*Primary Examiner* — Gary Mui
(74) *Attorney, Agent, or Firm* — Brinks Hofer Gilson & Lione

(57) ABSTRACT

Described herein is a method and system for formatting encoded video data. The encoder core makes use of unit structures with types that are undefined. These units are inserted into the encoder core output to carry additional information to a transport module. The transport module interprets the units for packetizing and/or multiplexing purposes. After being interpreted, the units may be taken out from the encoder core output, but there should be no adverse effects even if they are left in since no decoding process is defined for their particular type.

20 Claims, 4 Drawing Sheets

300

```
305 → Encode video data to produce an
        elementary video stream
            ↓
310 → Insert a network access layer (NAL)
        Unit into the elementary video stream
        to produce an enhanced elementary
        video stream
            ↓
315 → Format the enhanced elementary video
        stream based on the NAL Unit
```

FIGURE 3

METHOD AND SYSTEM FOR FORMATTING ENCODED VIDEO DATA

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video communications systems are continually being enhanced to meet needs such as reduced cost, reduced size, improved quality of service, increased data rate, and backward compatibility. Because of this rapid evolution, new video processors need to be designed, but the evolution should not outpace the market. It is very important to have formats and protocols that can be adapted for future standards and yet accommodate past standards. Enhanced standards should be made to maximize coding efficiency while continuing to allow the diversification of network types and their characteristic formats.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for formatting video data, substantially as shown in and/or described in connection with at least one of the figures, as set forth more completely in the claims.

These and other advantages and novel features of the present invention will be more fully understood from the following description.

BRIEF DESCRIPTION OF THE DRAWINGS

FIG. 3 is a flow diagram of an exemplary method for video encoding in accordance with an embodiment of the present invention.

DETAILED DESCRIPTION OF THE INVENTION

According to certain aspects of the present invention, a system and method for formatting video data are presented.

Most video applications require the compression of digital video for transmission, storage, and data management. An encoder core output is generally fed into a transport module. Typically, the transport module is not designed to parse and interpret encoder output such as Supplemental Enhancement Information (SEI). Hence it is necessary to provide other means for the encoder core to pass information to the transport module.

The encoder core makes use of unit structures with types that are undefined. These units are inserted into the encoder core output to carry additional video information to the transport module. The transport module interprets the units for packetizing and/or multiplexing purposes. The units may be taken out from the encoder core output, but there should be no adverse effects even if they are left in since no decoding process is defined for their particular type.

A clean interface is achieved between the signal processing technology of the encoder and the transport-oriented mechanisms of the transport module. No source-based encoding is necessary in heterogeneous networks.

Figure 1:
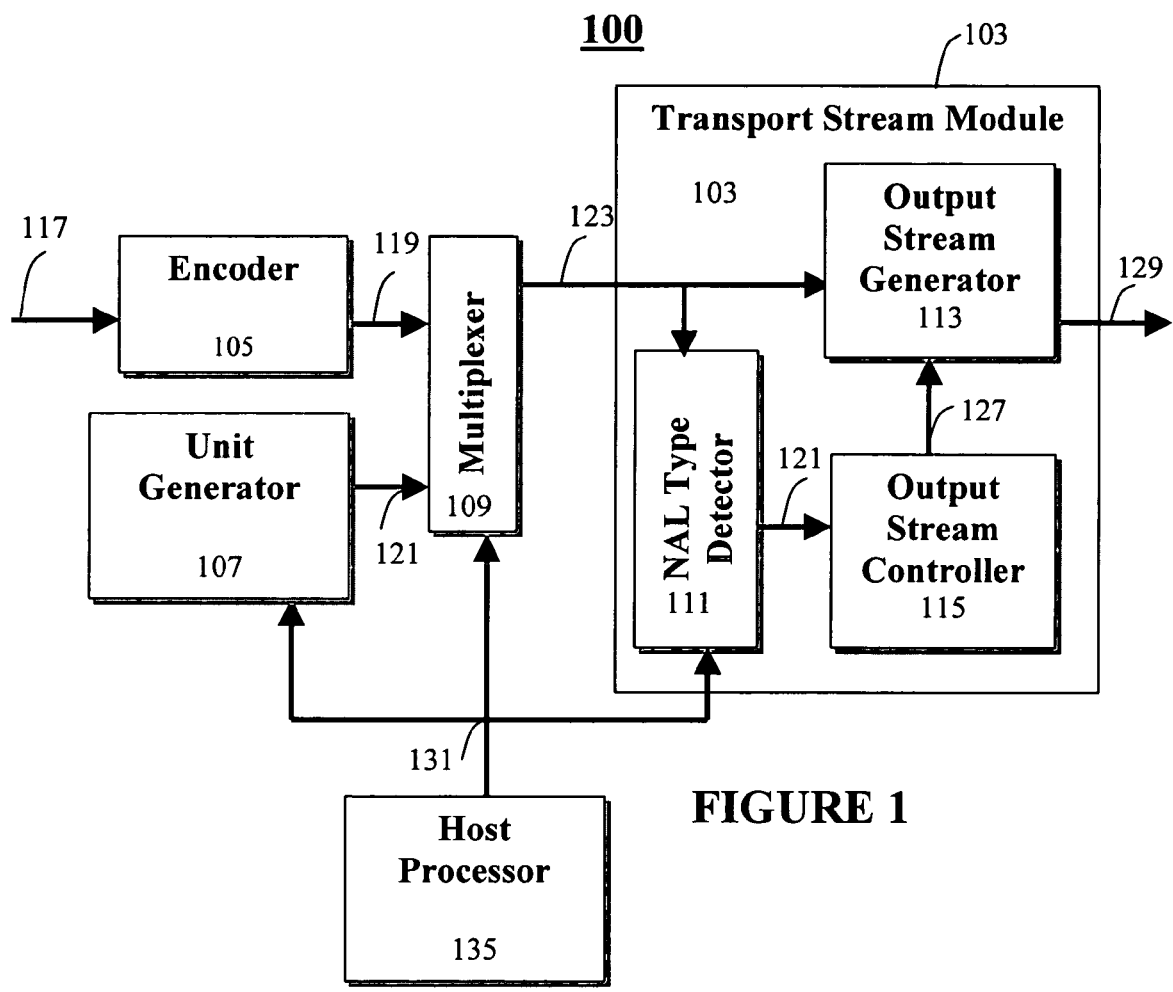
FIG. 1 is a block diagram of an exemplary video system in accordance with an embodiment of the present invention.

FIG. 1 is a block diagram of an exemplary video encoding system 100 that comprises an encoder 105, a unit generator 107, and a transport stream module 103.

The encoder 105 encodes video data 117 to generate an elementary stream 119. The unit generator 107 generates a supplemental packet or unit of data such as a supplemental network access layer (NAL) unit 121. The supplemental NAL unit 121 can be inserted into the elementary stream 119. A multiplexer 109 creates an enhanced elementary stream 123 by merging the elementary stream 119 and the supplemental NAL unit 121.

The transport stream module 103 formats the enhanced elementary stream 123 based on the supplemental NAL unit 121 detected within the enhanced elementary stream 123. NAL units 121 will typically contain a unit type in the first byte. A NAL Type Detector 111 can detect the supplemental NAL unit 121 based on this unit type. An output stream controller 115 can generate a message 127 that is based on the supplemental NAL unit 121. An output stream generator 113 uses the message 127 to format and/or add data to the enhanced elementary stream 123, thereby creating a formatted video output 129 or transport stream.

The supplemental NAL unit 121 may, for example, contain control parameters for packetizing and multiplexing the elementary stream 123. Alternatively, the supplemental NAL unit 121 may contain data to be included in a transmission packet of the formatted video output 129. The encoder can also be configured to insert or not to insert the supplemental unit 121 based on host command 131 from a host processor 135. If inserted, the transport module 103 has the option of removing the supplemental unit 121 from the elementary stream 123. If the supplemental unit 121 remains, a video decoder is likely to disregard it.

The use of NAL units is part of the H.264 Video Coding Standard that is described in the following details.

H.264 Video Coding Standard

The Moving Picture Experts Group (MPEG) standardizes digital video encoding. One exemplary standard is the ITU-H.264 Standard (H.264). H.264 is also known as MPEG-4, Part 10, and Advanced Video Coding. In the H.264 standard video is encoded on a picture-by-picture basis, and pictures are encoded on a macroblock by macroblock basis. H.264 specifies the use of spatial prediction, temporal prediction, transformation, interlaced coding, and lossless entropy coding to compress the macroblocks. The term picture is used throughout this specification to generically refer to frames, fields, macroblocks, or portions thereof.

Using the MPEG compression standards, video is compressed while preserving image quality through a combination of spatial, temporal, and spectral compression techniques. To achieve a given Quality of Service (QoS) with an even smaller bandwidth, video compression systems exploit the statistical redundancies in video sources; even though cutting edge video encoders make use of sophisticated tools to de-correlate spatial, temporal, and spectral sample dependencies, there are still some hidden statistical redundancies which remain embedded in the stream. Thorough identification of such redundancies plays a major role in reducing the size of the final output video stream. These redundancies are higher order correlations that are next to impossible to distinguish with low order predictors and are best identified via entropy coders. Since video sources are non-stationary in statistical sense, advanced entropy coders can take advantage of context modeling to adapt to changes in the source and achieve better compaction.

The specific algorithms used for video encoding and compression form a video-coding layer VCL, and the protocol for transmitting the VCL is called the Network Access Layer NAL. The H.264 standard allows a clean interface between the signal processing technology of the VCL and the transport-oriented mechanisms of the NAL. No source-based encoding is necessary in heterogeneous networks.

Figure 2:
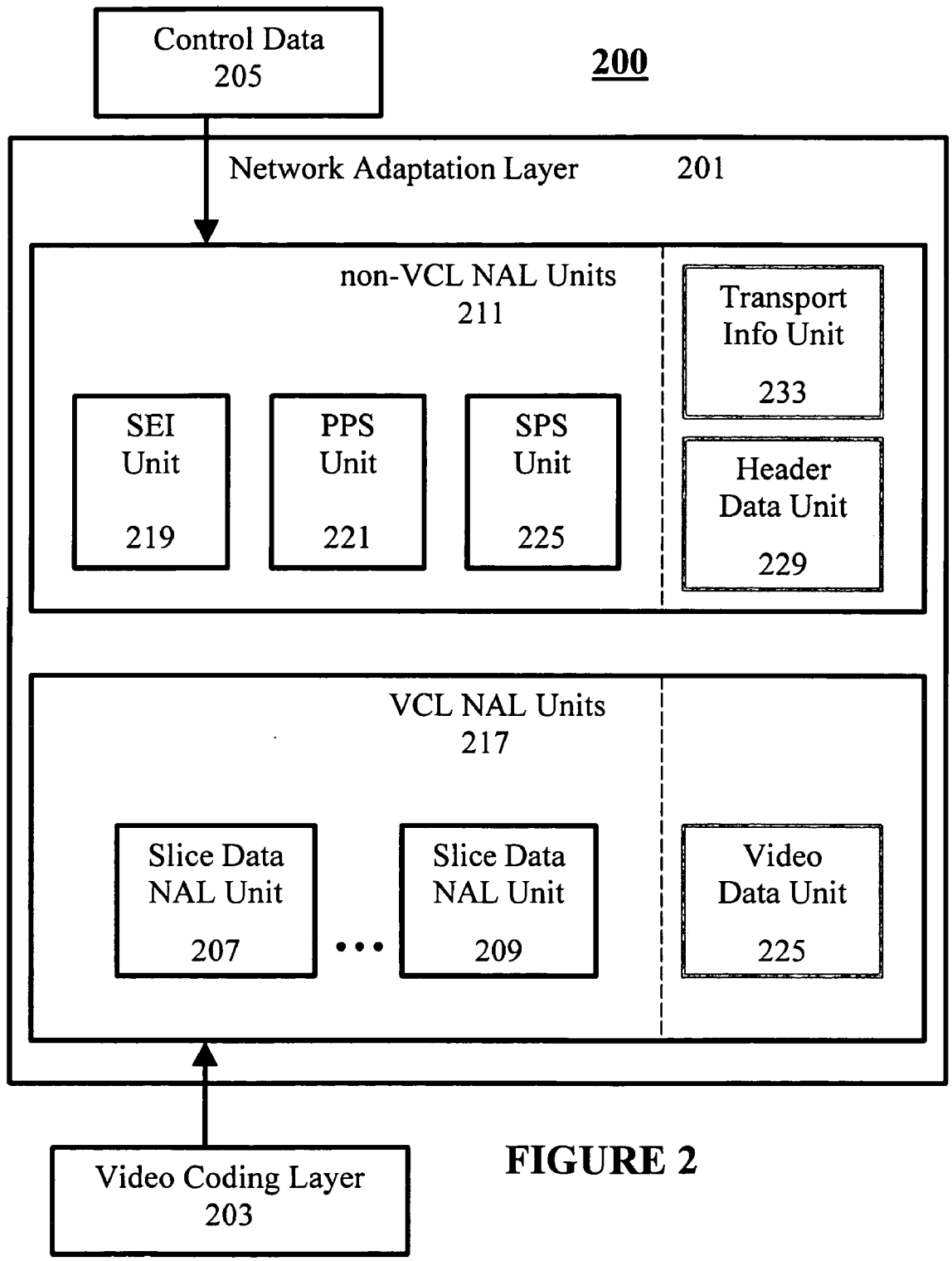
FIG. 2 is a diagram of an exemplary H.264 layer interface in accordance with an embodiment of the present invention.

FIG. 2 is a diagram of an exemplary H.264 layer interface 200. The Video Coding Layer (VCL) 203 efficiently represents video content through the encoding process specified in H.264. The Network Abstraction Layer (NAL) 201 formats the VCL representation of the video and provides header information in a suitable manner for a variety of transport layers or storage media. The Network Abstraction Layer (NAL) 201 depicts the components of an access unit. Data packets within the Network Abstraction Layer (NAL) 201 are NAL units and can be classified as VCL NAL units 217 or non-VCL NAL units 211.

VCL NAL units 217 contain the encoded slice data of a picture. One or more Slice Data NAL Units 207 and 209 can be included in the access unit.

Non-VCL NAL units 211 contain additional control data 205 such as supplemental enhancement information (SEI) and parameter set information. An SEI Unit 219 may contain timing information and other data that enhances the decoded video signal. The SEI Unit 219 is part of the access unit and may precede the VCL NAL Units 217. Parameter set information is important header data that can apply to a large number of VCL NAL units 217. Parameter set information is expected to rarely change and can correspond to a large number of VCL NAL units 211.

A parameter set unit can be a Sequence Parameter Set SPS Unit 225 or a Picture Parameter Set PPS Unit 221. The SPS Unit 225 applies to a series of consecutive coded video pictures called a coded video sequence, and the PPS Unit 221 applies one or more individual pictures within a coded video sequence. The PPS Unit 221 and the SPS Unit 225 are part of the access unit as well, but the PPS Unit 221 and the SPS Unit 225 can be sent well ahead of the VCL NAL units 217 and can be repeated to provide robustness against data loss. VCL NAL units 217 identify an associated PPS Unit 221, and the PPS Unit 221 identifies an associated SPS Unit 225. Therefore, the parameter set is not necessarily repeated in all of the VCL NAL units 217.

A Transport Information Unit 233 is designed with the NAL 201. The transport stream module 103 of FIG. 1 detects and interprets the Transport Information Unit 233 for packetizing and/or multiplexing purposes. The Transport Information Unit 233 may be taken out of the NAL 201, but there should be no adverse effects even if it is left in since no decoding process is defined for the type that is assigned the Transport Information Unit 233.

Before H.264 was standardized, there were other video coding standards such as H.261 and H.263.

H.261 Video Coding Standard

H.261 specifies data rates that are multiples of 64 Kbit/s that suit ISDN lines. The encoding algorithms specified by H.261 include inter-picture prediction to remove temporal redundancy, transform coding to remove spatial redundancy, motion vectorization to compensate for motion, and variable length coding to remove additional redundancy. H.261 supports Common Interchange Format (CIF) and Quarter Common Interchange Format (QCIF).

H.263 Video Coding Standard

H.263 specifies bandwidths as low as 20K to 24K bit/sec and is used in video-conferencing and video-telephony applications. H.263 is an enhancement over H.261 and requires half the bandwidth to achieve the same video quality as in the H.261.

Improvements in H.263 include the use of half pixel precision, better error recovery, Unrestricted Motion Vectors, Syntax-based arithmetic coding, Advance prediction, and bi-directional frame prediction. H.263 supports five resolutions. In addition to QCIF and CIF that were supported by H.261, H.263 supports Sub-QCIF at half the resolution of QCIF, 4CIF at 4 times the resolution of CIF, and 16CIF at 16 times the resolution of CIF.

H.261 and H.263 may transport video streams using the real-time transport protocol RTP. The RTP header is detailed in TABLE 1.

TABLE 1

Real-Time Transport Protocol

| Field | Length (bits) | Definition |
|---|---|---|
| V | 2 | Version of RTP |
| P | 1 | When set, padding octets are added at the end of the payload |
| X | 1 | When set, the fixed header is followed by exactly one header extension |
| CC | 4 | CSRC count |
| M | 1 | Marker |
| PT | 7 | Payload type |
| SN | 16 | Sequence number that increments by one for each RTP data packet sent |
| TS | 32 | Timestamp that reflects the sampling instant of the first octet in the RTP data packet |
| SSRC | 32 | SSRC identifies the synchronization source |
| CSRC list | 32 each | Identifies 0 to 15 contributing sources for the payload contained in this packet |

A H.261 or H.263 stream can be encapsulated as a VCL NAL Unit shown in FIG. 2 as a Video Data Unit 225. To support H.261 and H.263 RTP packetization, an additional Header Data Unit 229 may be defined to carry the RTP header information as defined in TABLE 1.

FIG. 3 is a flow diagram 300 of an exemplary method for video encoding. Encode video data to produce an elementary video stream 305, insert a network access layer (NAL) Unit into the elementary video stream to produce an enhanced elementary video stream 310, and format the enhanced elementary video stream based on the NAL Unit 315.

Figure 4:
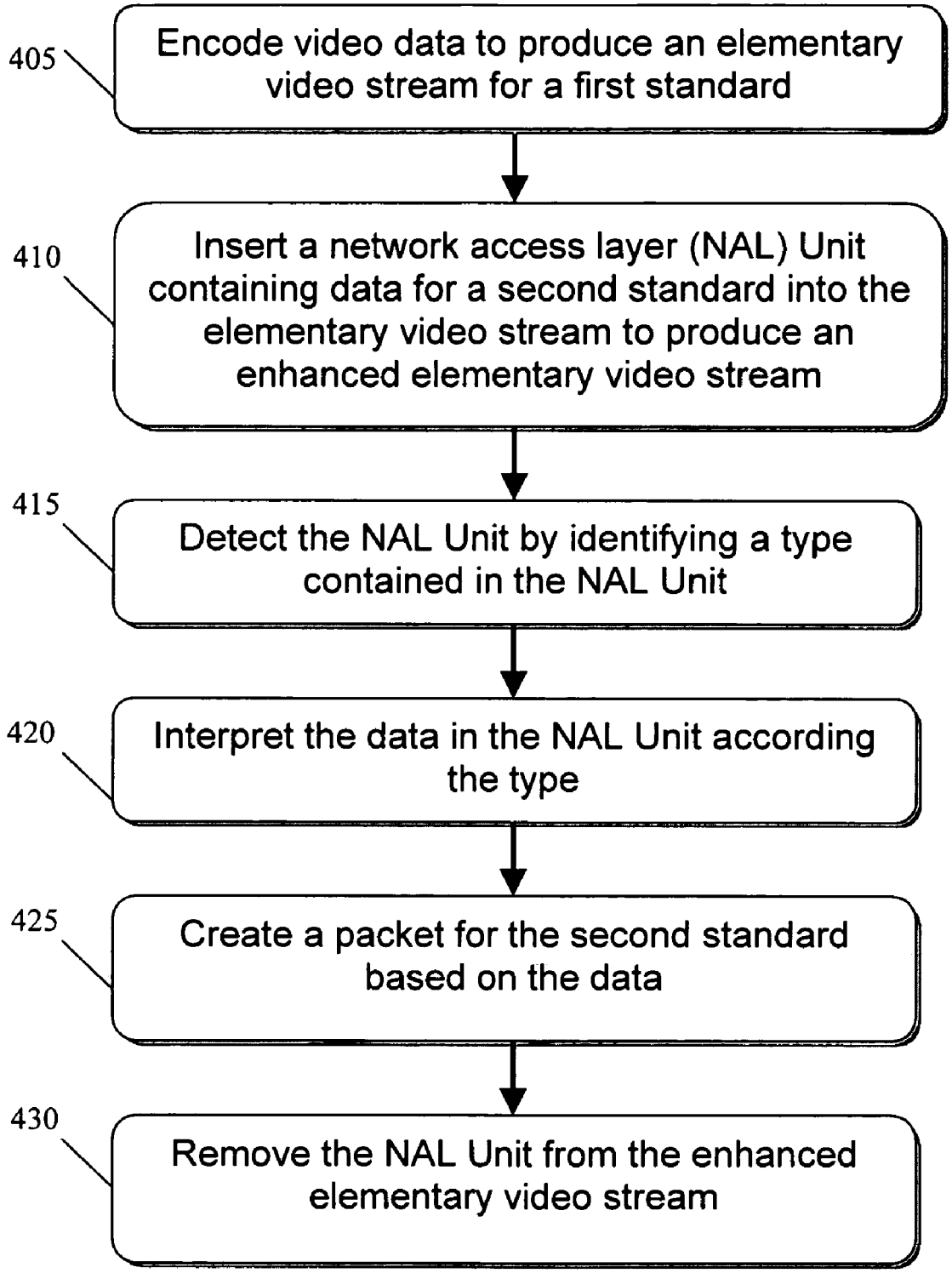
FIG. 4 is another flow diagram of an exemplary method for video encoding in accordance with an embodiment of the present invention.

FIG. 4 is another flow diagram 400 of an exemplary method for video encoding. Encode video data to produce an elementary video stream for a first standard 405. The first standard may be H.264 for example. Insert a network access layer (NAL) Unit containing data for a second standard into the elementary video stream to produce an enhanced elementary video stream 410. The second standard may be H.261 or H.263 for example. Detect the NAL Unit by identifying a type contained in the NAL Unit 415. In H.264, NAL unit types 24 through 31 are unspecified. Interpret the data in the NAL Unit according the type 420. Create a packet for the second standard based on the data 425. H.261 or H.263 may be transmitted with RTP packets. The transport module has the option to remove the NAL Unit from the enhanced elementary video stream 430.

The embodiments described herein may be implemented as a board level product, as a single chip, application specific integrated circuit (ASIC), or with varying levels of a video classification circuit integrated with other portions of the system as separate components. An integrated circuit may store a supplemental unit in memory and use an arithmetic logic to encode, detect, and format the video output.

The degree of integration of the video classification circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on MPEG-4 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for video encoding with format control, said method comprising:
    encoding video data, thereby producing an elementary stream;
    inserting a supplemental unit into the elementary stream; and
    formatting the elementary stream based on the supplemental unit,
    wherein the supplemental unit is in a network access layer and comprises a unit type.

2. The method of claim 1, wherein formatting further comprises:
    detecting the supplemental unit based on the unit type.

3. The method of claim 1, wherein the method further comprises:
    removing the supplemental unit from the elementary stream.

4. The method of claim 1, wherein formatting further comprises:
    parsing the elementary stream based on information contained in the supplemental unit.

5. The method of claim 1, wherein formatting further comprises:
    packetizing the elementary stream according to a Real Time Protocol based on information contained in the supplemental unit.

6. The method of claim 1, wherein formatting further comprises:
    removing data from the supplemental unit; and
    adding the data to a packet in the elementary stream.

7. The method of claim 1, wherein a transport module removes the supplemental unit form the elementary stream.

8. The method of claim 1, further comprising multiplexing the elementary stream based on information contained in the supplemental unit.

9. A video encoding system, said video encoding system comprising:
    an encoder for encoding video data, thereby generating an elementary stream;
    a unit generator for inserting a supplemental unit into the elementary stream; and
    a transport module for formatting the elementary stream based on the supplemental unit,
    wherein the transport module removes the supplemental unit from the elementary stream.

10. The video encoding system of claim 9, wherein the supplemental unit is in a network access layer and comprises a unit type that is detected by the transport module.

11. The video encoding system of claim 9, wherein the supplemental unit comprises control parameters for producing a packet in the elementary stream according to a Real Time Protocol.

12. The video encoding system of claim 11, wherein another supplemental unit comprises standardized header data to be included in the packet.

13. The video encoding system of claim 11, wherein another supplemental unit comprises H.261 video data to be included in the packet.

14. The video encoding system of claim 11, wherein another supplemental unit comprises H.263 video data to be included in the packet.

15. An integrated circuit for video encoding, said integrated circuit comprising:
    memory for storing a supplemental unit; and
    arithmetic logic operable to encode an input and insert the supplemental unit into a result, thereby generating an elementary stream, wherein formatting said elementary stream is based on the supplemental unit,
    wherein the supplemental unit further comprises data that is added to a packet in the elementary stream.

16. The integrated circuit of claim 15, wherein the supplemental unit is in a network access layer and comprises a unit type.

17. The integrated circuit of claim 16, wherein formatting further comprises detecting the supplemental unit based on the unit type.

18. The integrated circuit of claim 15, wherein the arithmetic logic is further operable to remove the supplemental unit from the elementary stream.

19. The integrated circuit of claim 15, wherein formatting further comprises multiplexing and packetizing the elementary stream based on information contained in the supplemental unit.

20. The integrated circuit of claim 15, wherein a transport module removes the supplemental unit form the elementary stream.

* * * * *